United States Patent
Saidutta et al.

(10) Patent No.: US 11,795,804 B2
(45) Date of Patent: Oct. 24, 2023

(54) AUTOMATED CONCURRENT PATH PLANNING AND DRILLING PARAMETER OPTIMIZATION USING ROBOTICS

(71) Applicant: Landmark Graphics Corporation, Houston, TX (US)

(72) Inventors: Yashas Malur Saidutta, Atlanta, GA (US); Srinath Madasu, Houston, TX (US); Shashi Dande, Spring, TX (US); Keshava Prasad Rangarajan, Sugar Land, TX (US); Raja Vikram R. Pandya, Katy, TX (US); Jeffrey M. Yarus, Houston, TX (US); Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 832 days.

(21) Appl. No.: 16/764,558

(22) PCT Filed: Jul. 12, 2019

(86) PCT No.: PCT/US2019/041612
§ 371 (c)(1),
(2) Date: May 15, 2020

(87) PCT Pub. No.: WO2021/010943
PCT Pub. Date: Jan. 21, 2021

(65) Prior Publication Data
US 2021/0404313 A1    Dec. 30, 2021

(51) Int. Cl.
*E21B 44/00*    (2006.01)
*E21B 7/04*    (2006.01)
(Continued)

(52) U.S. Cl.
CPC ............... *E21B 44/00* (2013.01); *E21B 7/04* (2013.01); *E21B 41/00* (2013.01); *G06Q 10/06313* (2013.01); *E21B 2200/22* (2020.05)

(58) Field of Classification Search
CPC . E21B 44/00; E21B 7/04; E21B 41/00; E21B 2200/22; E21B 2200/20; G06Q 10/06313
See application file for complete search history.

(56) References Cited

U.S. PATENT DOCUMENTS

| | | |
|---|---|---|
| 2006/0151214 A1 | 7/2006 | Prange et al. |
| 2009/0198447 A1* | 8/2009 | Legendre .............. G01V 3/18 |
| | | 702/11 |

(Continued)

FOREIGN PATENT DOCUMENTS

WO    2014210025    12/2014

OTHER PUBLICATIONS

Brochu et al., "A Tutorial on Bayesian Optimization of Expensive Cost Functions, with Application to Active User Modeling and Hierarchical Reinforcement Learning", Dec. 14, 2010, 49 pages.

(Continued)

*Primary Examiner* — Michael W Choi
(74) *Attorney, Agent, or Firm* — Kilpatrick Townsend & Stockton LLP (57) ABSTRACT

A drilling device may use a concurrent path planning process to create a path from a starting location to a destination location within a subterranean environment. The drilling device can receive sensor data. A probability distribution can be generated from the sensor data indicating one or more likely materials compositions that make up each portion of the subterranean environment. The probability distribution can be sampled, and for each sample, a drill path trajectory and drill parameters for the trajectory can be generated. A trained neural network may evaluate each (Continued)

trajectory and drill parameters to identify the most ideal trajectory based on the sensor data. The drilling device may then initiate drilling operations for a predetermined distance along the ideal trajectory.

20 Claims, 5 Drawing Sheets (51) Int. Cl.
*E21B 41/00* (2006.01)
*G06Q 10/0631* (2023.01)

(56) References Cited

U.S. PATENT DOCUMENTS

| | | | |
|---|---|---|---|
| 2010/0138368 A1* | 6/2010 | Stundner | G06N 20/00 706/47 |
| 2011/0153300 A1 | 6/2011 | Holl et al. | |
| 2011/0172976 A1 | 7/2011 | Budiman et al. | |
| 2013/0140037 A1 | 6/2013 | Sequeira, Jr. et al. | |
| 2015/0377003 A1* | 12/2015 | Benson | G05B 15/02 175/45 |
| 2021/0388715 A1* | 12/2021 | Panchal | E21B 47/003 |

OTHER PUBLICATIONS

Brochu, "Interactive Bayesian Optimization: Learning User Preferences for Graphics and Animation", A Thesis Submitted In Partial Fulfillment of the Requirements for the Degree of Doctor of Philosophy in the Faculty of Graduate Studies, Dec. 2010, 135 pages.
International Application No. PCT/US2019/041612, "International Search Report and Written Opinion", dated Apr. 9, 2020, 10 pages.
Solomon, "Development of a Real-time Hierarchical 3D Path Planning Algorithm for Unmanned Aerial Vehicles", Master of Science, 2016, 95 pages.

* cited by examiner

FIG. 5 ns and directional descriptions
AUTOMATED CONCURRENT PATH PLANNING AND DRILLING PARAMETER OPTIMIZATION USING ROBOTICS

TECHNICAL FIELD

The present disclosure relates generally to hydrocarbon extraction operations. More particularly, the present disclosure relates to automated subterranean drilling systems and automated concurrent path planning for automated subterranean drilling systems.

BACKGROUND

Subterranean drilling for hydrocarbon extraction operations can be subject to many unknown factors. For instance, since little of the subterranean environment may be known drilling to a predetermined location within the environment may necessitate drill through a number of unknown subterranean formations such as dirt, rock, metal deposits, water, etc. Drilling through unknown subterranean formations can damage the drill bit and drill string. For example, if the weight-on-bit is too high, which can occur when unknowingly drilling through a dense material, the drill bit has a higher chance of excess wear or damage and the drill string can begin to buckle. If the weight-on-bit is too low, the rate of penetration may suffer causing drilling operations to stall. Even when some or all of the subterranean formations within the subterranean environment are known, it may be difficult to reliably reach a drilling destination without excessive wear on the drilling platform.

DETAILED DESCRIPTION

Certain aspects and features relate to concurrent path planning for autonomous subterranean drilling devices. Automated drilling devices include one or more sensors, one or more actuators, a drill bit, and instructions that are executed by a processor of the automated drilling devices. The instructions use the one or more sensors to capture measurements of the subterranean environment proximate to the automated drilling device. The sensor data can be sampled to generate multiple possible drill path trajectories from a current location of the automated drilling devices to a destination location. A machine-learning model can be used to select the sample with the best drill path trajectory and the automated drilling devices can initiate drilling operations using the actuators to rotate the drill bit along that drill path trajectory for a predetermined distance. Once the predetermined distance is reached or a certain amount of divergence from the planned path is noted, the process may repeat, using new sensor data to update the drill path trajectory.

Drill parameters such as a revolution-per-minute, mud flow rate, and weight-on-bit can also be defined for each drill path trajectory. Drilling operations can be initiated using the optimal drill path trajectory to the destination using the optimal dill parameters. The optimal drill path trajectory may reduce the drilling distance between the surface and a destination location within the subterranean environment. The optimal drill parameters may reduce wear on the automated drilling device and improve the rate-of-penetration, which can reduce the overall drilling time to the destination location and reduce non-productive time (NPT).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
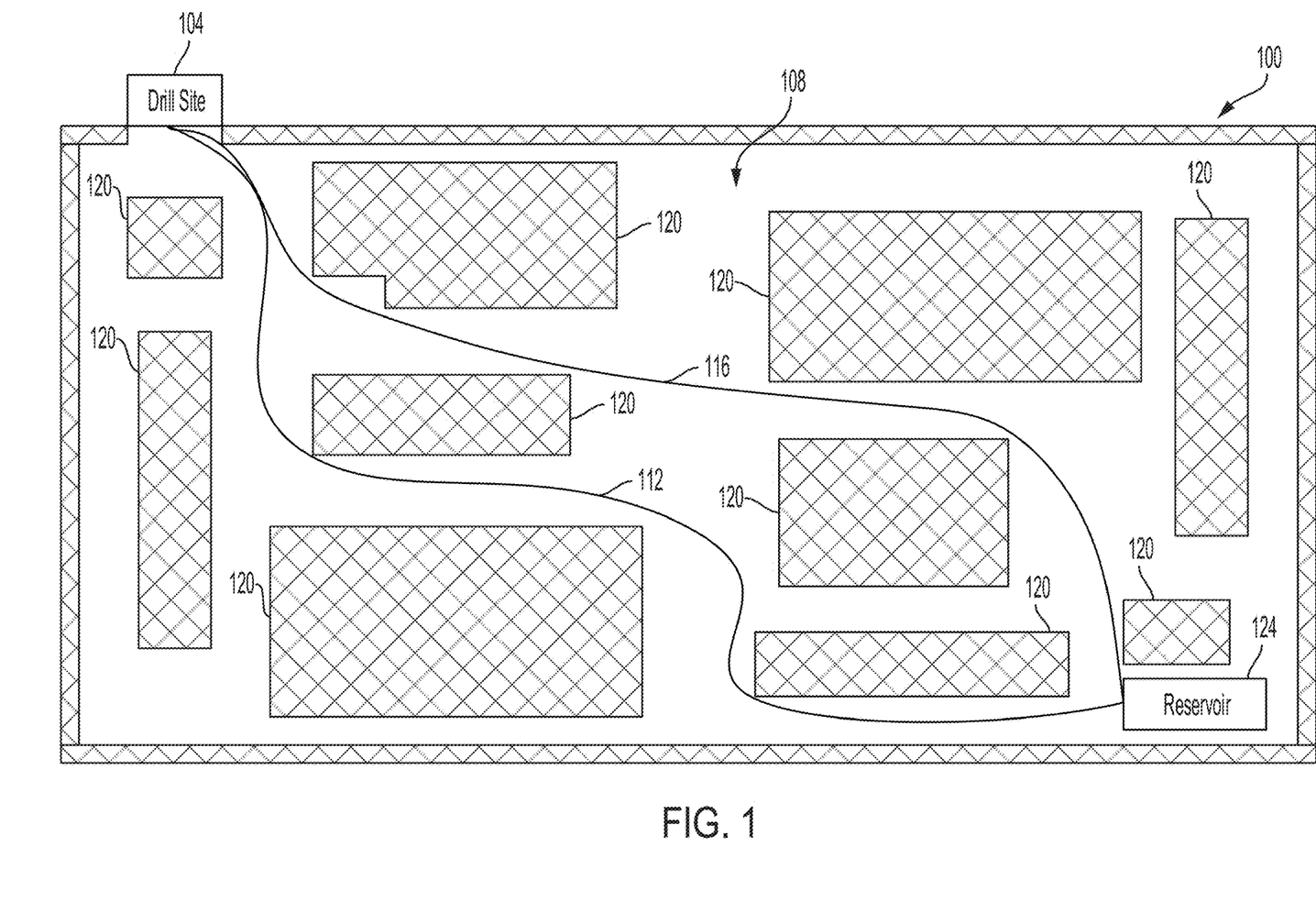
FIG. 1 is a block diagram of a subterranean environment in which an automated concurrent pathfinding may be used by an automated drilling device according to at least one aspect of the disclosure.

FIG. 1 is a block diagram of a subterranean environment 108 in which an automated concurrent pathfinding may be used by an automated drilling system according to one aspect of the disclosure. A drill site 104 may be selected to initiate drilling operations. The drill site may be selected at a particular location on surface 108 based on a location of a drilling destination such as reservoir 124. Reservoir 124 may include a collection of resources such as a hydrocarbons that are to be extracted. Reaching the destination may be impeded by subterranean formations 120 within the environment. Examples of subterranean formations 120 can include, but are not limited to, types of rock formations, metal deposits, water, combinations thereof, and the like.

Drilling through subterranean formations may extend drilling operations and increase wear on the drill bit. Drilling through rock or metal, for example, may decrease the rate of penetration, which may increase the overall duration of drill operations. The added weight-on-bit may also cause greater wear on the drill bit. A path from a drill site to reservoir 124 may be identified that reduces or eliminates drilling through subterranean formations. In some instances, there may be multiple viable paths from the drill site 104 to reservoir 124. Since little may be known about the subterranean formations or the subterranean environment, it may be difficult to identify, much less select, the most efficient or least costly path.

Automated drilling devices may be used to identify efficient drilling paths from a drill site 104 to reservoir 124 by updating the drill path with every few feet of progress by the drill. Automatized drilling devices may operate without the subterranean environment or subterranean formations being known. Automated drilling devices may use sensors to detect the subterranean environment and subterranean formations 120 within. As an automated drilling device progresses along a drill path, the sensors may incrementally update the subterranean map. The new subterranean map may include identification of types of subterranean formations or new subterranean formations that were omitted from the previous map. The automated drilling device may use the new subterranean map to update existing drill paths or generate entirely new drill paths. Since the drill paths are updated every few feet, the path from the drill site 104 to the reservoir 124 maximizes the use of known information to improve the drill path.

FIG. 1 depicts drill path 112 and drill path 116. The drill paths can be defined using two different pathfinding processes. The first, drill path 112, may use HD*, which combines information of the known terrain with assumptions of the unknown portion of the terrain to plot the shortest, or lowest cost, path to the destination. Cost may refer to Euclidean distance, costs associated with drilling operations including, but not limited to, time interval of drilling operations, wear and tear on drilling equipment, cost of resources such a fuel or electricity, combinations thereof, or the like. Every few feet, or any predetermined distance, along the path, the automated drilling devices updates the map with any additional information and replots that shortest, or lowest cost, path. Drill path 112 avoids all of the subterranean formations to reach the reservoir 124 with a lower cost than if the automated drilling device followed a path through one or more of subterranean formations 120.

The second, drill path 116, may use a Bayesian Optimization Hierarchical HD* (BO-HD*) process that can identify a shorter, or lower cost, path through the subterranean environment. The system defines a probability distribution based on the sensor data and previously defined subterranean maps. The probability distribution may be sampled multiple times in which probabilities for various unknown portions of the subterranean environments may be used as the assumptions of the unknown portions of the subterranean environment. Drill paths may be defined for each sample and the sample with the shortest path, or lowest cost, can be selected. The drill path may be determined using one or more path prediction processes including, but not limited to, Bayesian optimization or a trained neural network. Once the drill path is selected, drill parameters such as weight on bit, revolutions-per-minute, etc. can be selected using the map of the subterranean environment and the selected drill path as inputs into a trained neural network. Every few feet, or any predetermined distance, along the path, the automated drilling devices updates the map with any additional information and replots that shortest, or lowest cost, path. The drill path generated by BO-HD* is shorter than the drill path generated by HD* while still avoiding subterranean formations 120.

Figure 2:
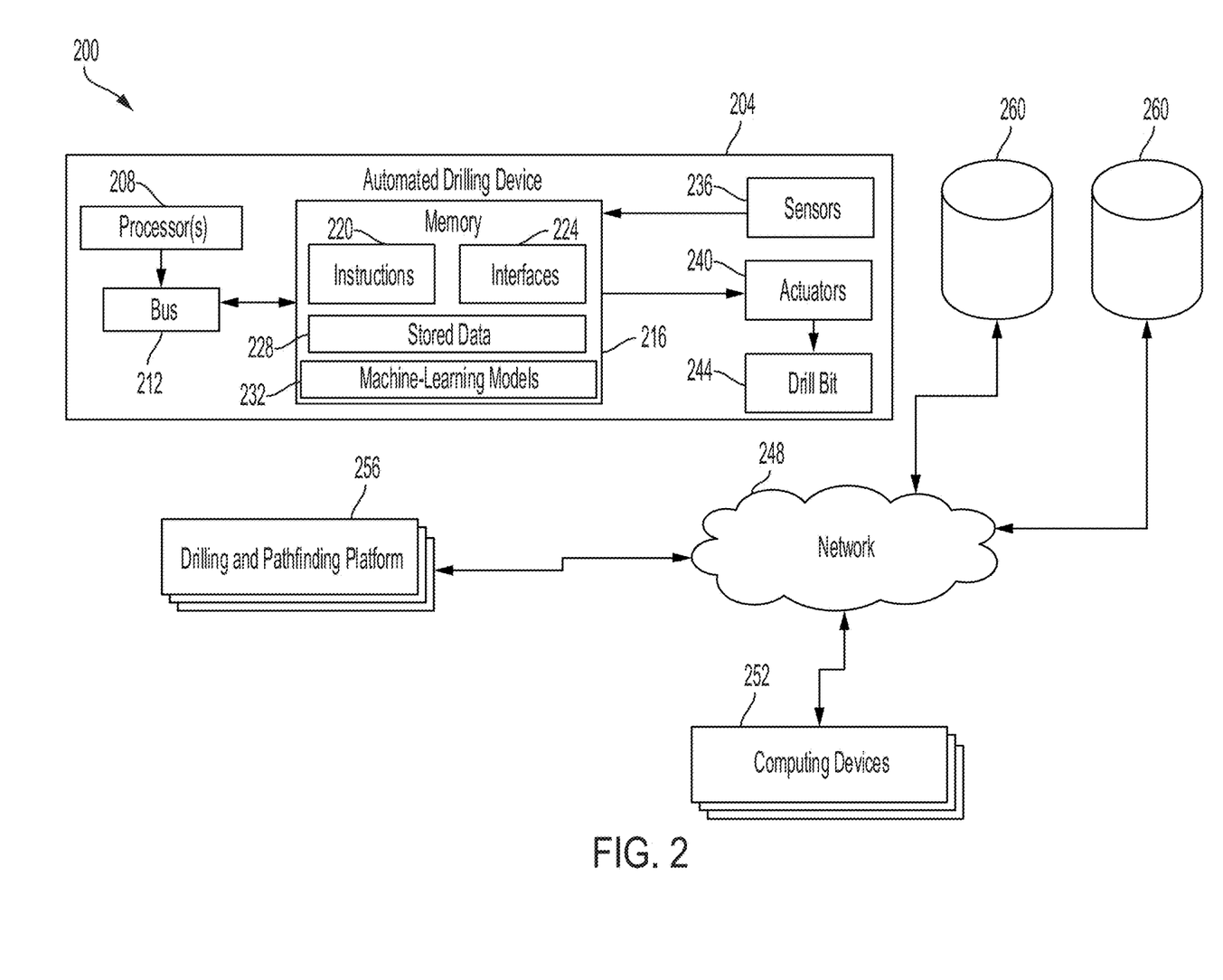
FIG. 2 is a block diagram of an automated drilling system according to at least one aspect of the disclosure.

FIG. 2 is a block diagram of an automated drilling system 200 according to one aspect of the disclosure. Automated drilling system can include an automated drilling device 204, one or more drilling and pathfinding platforms 256, one or more computing device 252, and one or more databases 260 that connected through a network 248. The network may be a wired or wireless network such as, not limited to, a local area network, a wide area network, a cloud network, Wi-Fi network, a cellular network, combinations thereof, and the like. Automated drilling device 204 may operate autonomously or by commands received by drilling and pathfinding platform 256 or computing devices 252. In some instances, automated drilling device 204 may receive data from other automated drilling devices, from drilling and pathfinding platform 256, or computing devices 252 that may improve one or more operations of automated drilling device 204. For example, other automated drilling devices may transmit data corresponding to a subterranean environment that may enable an automated drilling device 204 to improve identification of a drill path to a reservoir.

Automated drilling device 204, can include one or more processors 208 connected via bus 212 to memory 216. In some instances, memory may be include a non-transitory computer-readable medium. Examples of non-transitory computer-readable media include, but are not limited to flash memory, one or more hard disk drives, non-volatile memory, combinations thereof, or the like. Memory 216 can include one or more sets of instructions 220 that control functions of the automated drilling device 204 and identification of drill paths. For example, one or more sets of instructions 220 can include instructions that execute a BO-HD* process for identifying an ideal path from a current location of automated drilling device 204 to a predetermined location such as a reservoir of hydrocarbons. For example, automated drilling device 204 may receive sensor data from one or more sensors 236 through interfaces 224. The data may be combined with stored data 228, which include data that is already known about the subterranean environment. One or more sets of instructions 220 use the stored data 228 and sensor data to generate a probability distribution to sample. The samples can be used to calculate a drill path trajectory to the reservoir.

One or more sets of instructions 220 may process the drill path trajectory of each sample to identify a shortest drill path trajectory or a lowest cost drill path trajectory. In some instances, one or more sets of instructions 220 may pass the drill path trajectories into machine-learning model 232 trained to identify the shortest drill path trajectory or the lowest cost drill path trajectory. Machine-learning model 232 may use Bayesian optimization, a neural network, or a combination thereof to identify the drill path trajectory. One or more sets of instructions 220 may use the samples to determine one or more drill parameters such as the weight-on-bit or revolutions-per-minute. In some instances, one or more sets of instructions 220 may pass the samples to the same or different machine-learning model 232 to determine the drill parameters.

One or more sets of instructions 220 may convert the drill parameters to commands. The commands may be executed causing interfaces 224 to transits control signals to actuators 240. Actuators 240 may transfer electrical energy to mechanical energy to operate one or more motors. For example, an actuator may receive control signals from interfaces 224 and cause drill bit 244 to rotate at a particular revolutions-per-minute. Actuators 240 may also be used to transfer weight to or from drill bit 244. A rate of penetration, or rate in which the automated drilling device 204 progresses along the drill path trajectory, may be based on the weight-on-bit. If the weight-on-bit is too high for a given subterranean environment, the drill bit may experience excessive wear. On the other hand if the weight-on-bit is too low for a given subterranean environment, then the rate of penetration will be reduced. Machine-learning models 232 may be used to optimize the drill parameters based on the particular portion of the subterranean environment of automated drilling device 204. Each time a drill path trajectory is determined using BO-HD*, machine-learning models 232 may identify new drill parameters for the automated drilling device 204. Though not shown, interfaces 224 may include one or more interfaces for sensors 236, actuators 240, and network interfaces to communicate via a wired or wireless connection with network 248.

Drilling and pathfinding platform 256 can include one or more computing devices that receive and process data from automated drilling device 204 as well as other automated drilling devices. In some instances, drilling and pathfinding platform 256 may receive the raw sensor data from sensors 236 and process the data in the same manner and at the same time as automated drilling device 204. The resulting drill path trajectory computed by drilling and pathfinding platform 256 can be compared to the drill path trajectory of automated drilling device 204 to provide verification of the drill path trajectory and the trained machine-learning models 232. If verification fails, such as if the trajectories diverge by more than a threshold amount, one or more remedial processes may be executed. Examples of remedial processes can include, but are not limited to, re-training one or more of machine-learning models 232 using data from automated drilling device 204, drilling and pathfinding platform 256, or databases 260; taking automated drilling device 204 offline for further diagnostics or repair; replacing the automated drilling device 204; placing automated drilling device 204 in a slave state in which automated drilling device 204 operates via commands received from drilling and pathfinding platform 256; combinations thereof; or the like.

In other instances, one or more operations of automated drilling device 204 may be executed by drilling and pathfinding platform 256. Drilling and pathfinding platform 256 can include one or more computing devices each including one or more processors and memory. Drilling and pathfinding platform 256 can additionally include one or more network interfaces that enable wired or wireless communications with automated drilling devices directly or through network 248. One or more of instructions 220, stored data 228, and machine-learning models 232 of automated drilling device 204 may be stored in drilling and pathfinding platform 256. Automated drilling platform 256 may receive sensor data from one or more sensors 236, and transmit commands to automated drilling device 204 to operate actuators 240 and drill bit 244. In those instances, the BO-HD* process may be executed by drilling and pathfinding platform 256 either partly or entirely and the output from the executed BO-HD* process, or each iteration thereof, can be transmitted to automated drilling device 204. Alternatively, automated drilling platform 256 may generate commands that control the operations of automated drilling device 204 based on the output from the executed BO-HD* process causing the automated drilling device 204 to drill along the drill path trajectory identified by the executed BO-HD* process.

Computing devices 252 can include one or more computing devices that monitor and control the operations of one or more automated drilling devices and drilling and pathfinding platforms 256. In some instances, computing devices 252 may execute diagnostics processes on the software or hardware operations executed by automated drilling devices. For example, computing devices 252 can monitor, in real-time, sensor data, stored data 228, one or more sets of instructions 220, and machine-learning models. In some instances, computing devices 252 can compare data corresponding to sensor data, stored data 228, one or more sets of instructions 220, or machine-learning models to baseline datasets and in response to detecting a deviation from the baseline over a threshold execute a remedial action. Diagnostic process can be executed once or on a regular basis such as in set intervals. Examples of intervals can include, but are not limited to, a distance of the drill path traversed such as every 5 feet, an iteration of a BO-HD* process such as each time the drill path trajectory is recalculated, a time interval such as every 30 seconds or every 30 minutes, combinations thereof, and the like. Remedial actions can include, but are not limited to, when an actual drill path deviates from a planned drill path trajectory by more than a predetermined amount such as 3 feet, 5 feet, or the like; taking the automated drilling device offline; re-provisioning the stored data 228, one or more sets of instructions 220; re-training the machine-learning model, combinations thereof, and the like.

Computing device 252 may generate a graphical user interface that may display detailed information including real-time sensor data from sensors 236, the current map of subterranean environment generated by the BO-HD* process, input and output from machine-learning models 232, stored data 228, and the like. The graphical user interface may present the detailed information for associated with each of multiple automated drilling devices within a same display window enabling a user to view the detailed information of more than one automated drilling device side-by-side.

Computing devices 252 may perform some or all training operations for machine-learning models 232 and machine-learning models stored in drilling and pathfinding platform 256. Machine-learning models may be trained via supervised or unsupervised learning. In supervised learning, a set of subterranean environments may be received, each being labeled with particular drill path trajectories and drill parameters. The labeling may be received from drilling experts or based on historical drilling data. The machine-learning model may use the set of subterranean environments, as input, and the labels, as expected output, to define one or more functions that will output an expected trajectory and drill parameters for a given corresponding subterranean environment. The accuracy of the one or more functions, and the machine-learning model, may depend on the number of labeled subterranean environments used to train the machine-learning model. Examples of algorithms that can be used for supervised learning include, but is not limited to, regression including linear and non-linear, Bayesian statistics, neural networks, decision trees, Gaussian process regression, nearest neighbor, combinations thereof, and the like.

In unsupervised learning, the set subterranean environments may not be labeled such that the machine-learning models may not have access to particular drill path trajectories or drill parameters. Since expected output of the machine-learning model is unknown, the machine-learning model may use different algorithms from those used during supervised learning. Unsupervised learning may focus on identifying correlations between (1) two or more properties and (2) one or more properties and the external information. Unsupervised learning may generate drill path trajectories and drill parameters and then evaluate them for viability or cost. The output may be compared to other outputs generated from the same input to identify drill paths and drill parameters that are more efficient than others.

For example, a machine-learning model may generate from a particular subterranean environment multiple drill path trajectories of various lengths and costs. The multiple drill path trajectories may be input into the machine-learning model and processed against each other to identify the most efficient path as well what made that path the most efficient path. Efficiency can be based on a hierocracy of rules, a weight assigned to one or more properties, combinations thereof, or the like. For example, paths that avoid subterranean formations may be ranked higher, or weighted higher, than paths that do not. In some instances, some paths may be discarded for violating one or more rules. For example, paths that pass through a subterranean formation, exceed a particular length, or other parameter may be discarded provided that at least one path exists that does not pass through a subterranean formation. Examples of unsupervised learning algorithms for machine-learning models include, but are not limited to, clustering, neural networks, outlier detection, combinations thereof, or the like.

Machine-learning models 232 can be re-trained upon set intervals such as the expiration of time interval or after a number of outputs are generated by the machine-learning model. In some instances, the machine-learning models may be tested by, for example, comparing the output of a machine-learning model to a baseline output. If a deviation is detected in the output of trained machine-learning models 232, machine-learning models 232 may be retrained. In some instances, the machine-learning models 232 may be retrained by computing devices 252 or by drilling and pathfinding platform 256. For example, a fresh, un-trained model may be trained using the same initial training data that originally was used to train the machine-learning model or the original training data may be combined with new data obtained through operation of automated drilling device. The trained machine-learning model may be transmitted to the automated drilling device.

In other instances, the automated drilling device may enter a recovery mode that deletes machine-learning models 232 and loads a un-trained model from read-only memory. The un-trained model may be trained using the same initial training data that originally was used to train the machine-learning model or the original training data may be combined with new data obtained through operation of automated drilling device. The original training data may be stored in stored data 228 or transmitted from drilling and pathfinding platform 256, computing device 252 or from databases 260.

Figure 3:
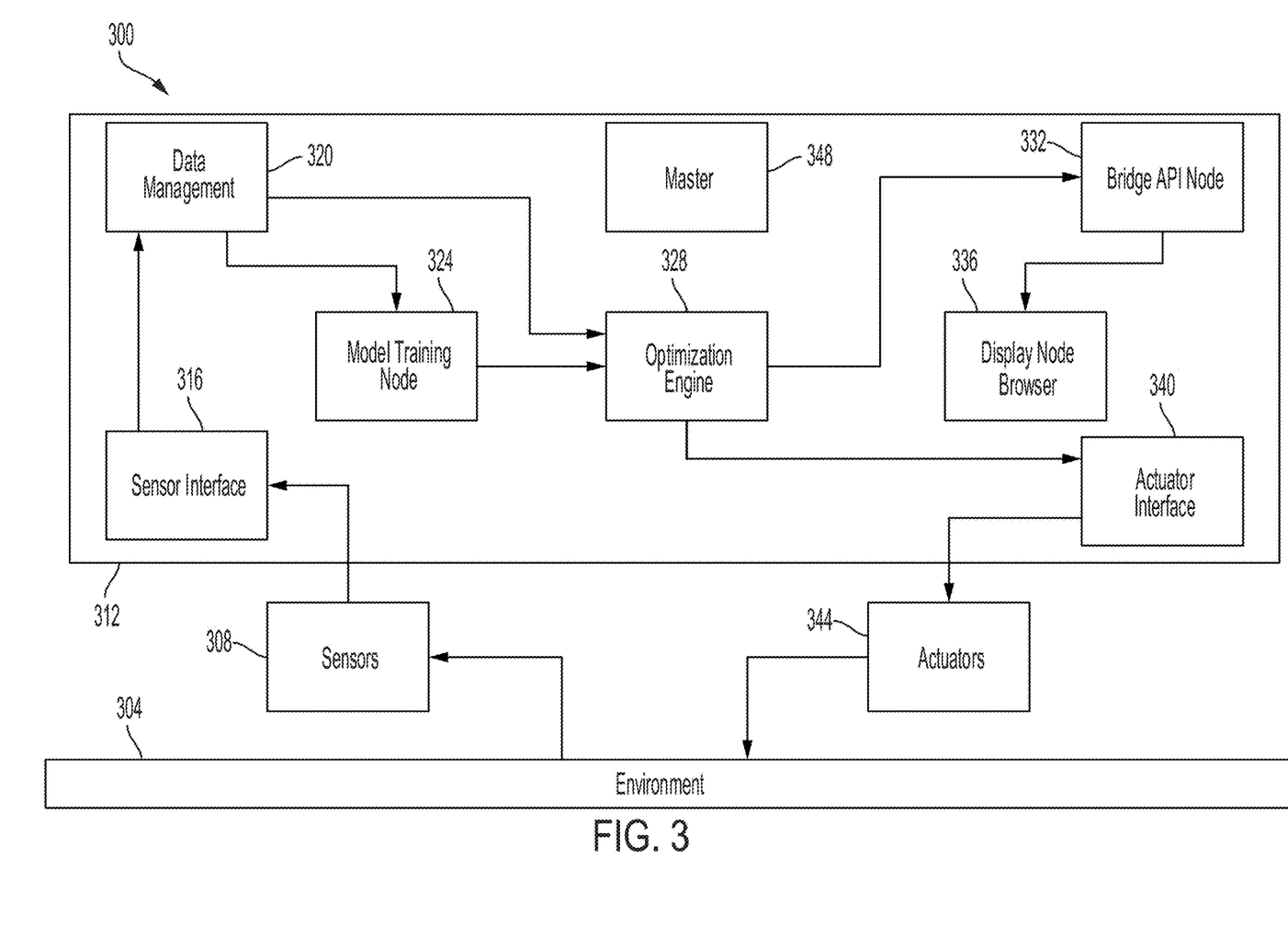
FIG. 3 is a block diagram of an automated drilling device according to at least one aspect of the disclosure.

FIG. 3 is a block diagram of an automated drilling device 300 according to one aspect of the disclosure. Automated drilling device may operate within an environment 304 such as a subterranean environment. Characteristics of environment 304 may be detected by measurements obtained by one or more sensors 308. For example, sensors may measure pressure, temperature, velocity, weight-on-bit, mud flow rate, rate of penetration, a material composition such has through spectroscopy, or the like. The measurements may be received from automated drilling device 312 through a sensor interface 316. Sensor interface 316 may include one or more interfaces that translate the raw measurements obtain sensors 308 into analog or digital signals that are readable by aby data management 320.

Data management 320 can receive sensor data from sensor interface 316 and provide further processing. For example, sensor data may be very noisy, which can make the data difficult to use or otherwise unreliable. Data management 320 may process the data by, for example, eliminating outliers, normalizing values based on type of sensor, or the like. Data management may receive data continuously or at set intervals such as a time interval or a distance interval. Data management 320 may sample the process data based on one or more parameters for use as input into a machine-learning model. For example, data management 320 may generate samples according to particular time intervals such as every 30 milliseconds or every 30 seconds, etc. In other examples, data management 320 may sample based on types of sensors such that each sample includes data from a particular one or more types of sensors.

Data management 320 can transmit the processed data or samples to model training node 324. Model training node 324 includes processes that train and re-train machine-learning models using the sensor data. In some instances, each machine-learning model may be initially trained from historical data or data received from an external source. In those instances, model training node 324 may use sensor data from sensors 324 to re-train the machine-learning models with contemporaneously collected and processed sensor data. Machine-learning models may be re-trained (1) upon detecting one or more properties of the machine-learning model exceeding a corresponding one or more thresholds; (2) upon the expiration of a predetermined interval such as time or distances; (3) continuously each time the machine-learning model process and input to generate an output drill path trajectory or drill parameters; or (4) combinations thereof.

Optimization engine 328 receives the processed sensor data from data management 320 and generates an input for the machine-learning model trained by model training node 324. The trained-machine-learning models can generate a drill path trajectory for automated drilling device 312 and drill parameters using a BO-HD* process described above. In some instances, a first machine-learning model generates the drill path trajectory while a second machine-learning model using the generated input and the drill path trajectory generates the drill parameters for the drill path trajectory. The generated input may be based on the particular machine-learning model that processes the input. For example, the input for the first machine-learning model may include more or less sensor data than the second machine-learning model. In other instances, the same machine-learning model may be used to generate both the drill path trajectory and the drill parameters for the drill path trajectory.

Optimization engine 328 generates a first output to Bridge API Node 332 that provides an interface for display node browser 336. Bridge API Node 332 is an application programming interface (API) that exposes functions to external services. The functions can be called by external services to access data stored by data management including raw and processed sensor data, drill path trajectories, diagnostic data, machine-learning model metrics, drill parameters, combinations thereof and the like. Bridge API Node 332 may use a standard file format to present the output generated by the functions. Examples of standard file formats are JavaScript Object Notation (JSON), eXtensible Markup Language (XML), comma-separated values (CSV), Multipurpose Internet Mail Extensions (MIME), or the like.

Bridge API Node 332 may be used by Display Node Browser 336 to generate a graphical user interface for display by a display device. Display devices may be located on automated drilling device 312 or in a remote location from automated drilling device 312. For example, one or more instructions may be received from the remote computing device by the automated drilling device. The one or more instructions may use Bridge API Node 332 to define one or more how the graphical user interface is to be presented. Bridge API Node 332 and Display Node Browser 336 may generate the user interface according to the one or more instructions and transmit the graphical user interface to the remote computing device. Bridge API Node 332 and Display Node Browser 336 may generate graphical user interface once, in set intervals, or the graphical user interface may be streamed in real-time to present contemporaneously collected sensor data, current drill path trajectories, and current drill parameters.

Optimization engine 328 can convert the drill path trajectory and the drill parameters into a set of commands that execute to cause the automated drilling device 312 to follow the drill path trajectory using the drill parameters. The set of commands can be executed in a particular sequence to cause a drill bit of automated drilling device 312 to rotate at a particular revolutions-per-minute with a particular weight-on-bit, etc. Executed commands transmit signals to actuator interface 320, which converts the signals to a format that can drive actuators 344. Actuators 344 convert electrical energy to mechanical energy that enables an electrical signal to cause the dill bit to rotate in a particular direction. One or more actuators of actuators 344 can cause drill bit to rotate at a particular revolutions-per-minute. Another one or more actuators of actuators 344 may control a weight-on-bit value for the drill bit. By controlling the revolutions-per-minute, mud flow rate, and weight-on-bit, the automated drilling device 312 may control a rate of penetration through the subterranean environment 304.

Master 348 controls the operations of the subsystems 316-340 of automated drilling device 312. Master 348 may execute control software such as an operating system or middleware. For example, the software may be a real-time operating system (RTOS), robot operating system (ROS) such as ROS JavaScript (ROSJS), or the like. ROS may be a flexible multi-node framework for peer-to-peer robotic software. Master 348 may execute the functions that cause the operation of each subsystem. Alternatively, each subsystem may include separate sets of instructions that independently execute to provide the functionality of that subsystem. In some instances, master 348 may receive diagnostic data from each subsystem and compare the diagnostic data to baseline data. If the diagnostic data from a particular subsystem differs from the baseline by a threshold amount, remedial action may be executed. For example, the subsystem may be replaced by a redundant subsystem (not shown), the software of the subsystem can be re-provisioned by replacing the software with a copy of the software in read-only memory, another subsystem may perform the operations of the failed subsystem, automated drilling device 312 may temporarily cease operations, automated drilling device 312 may reboot, combinations therefor, or the like.

Figure 4:
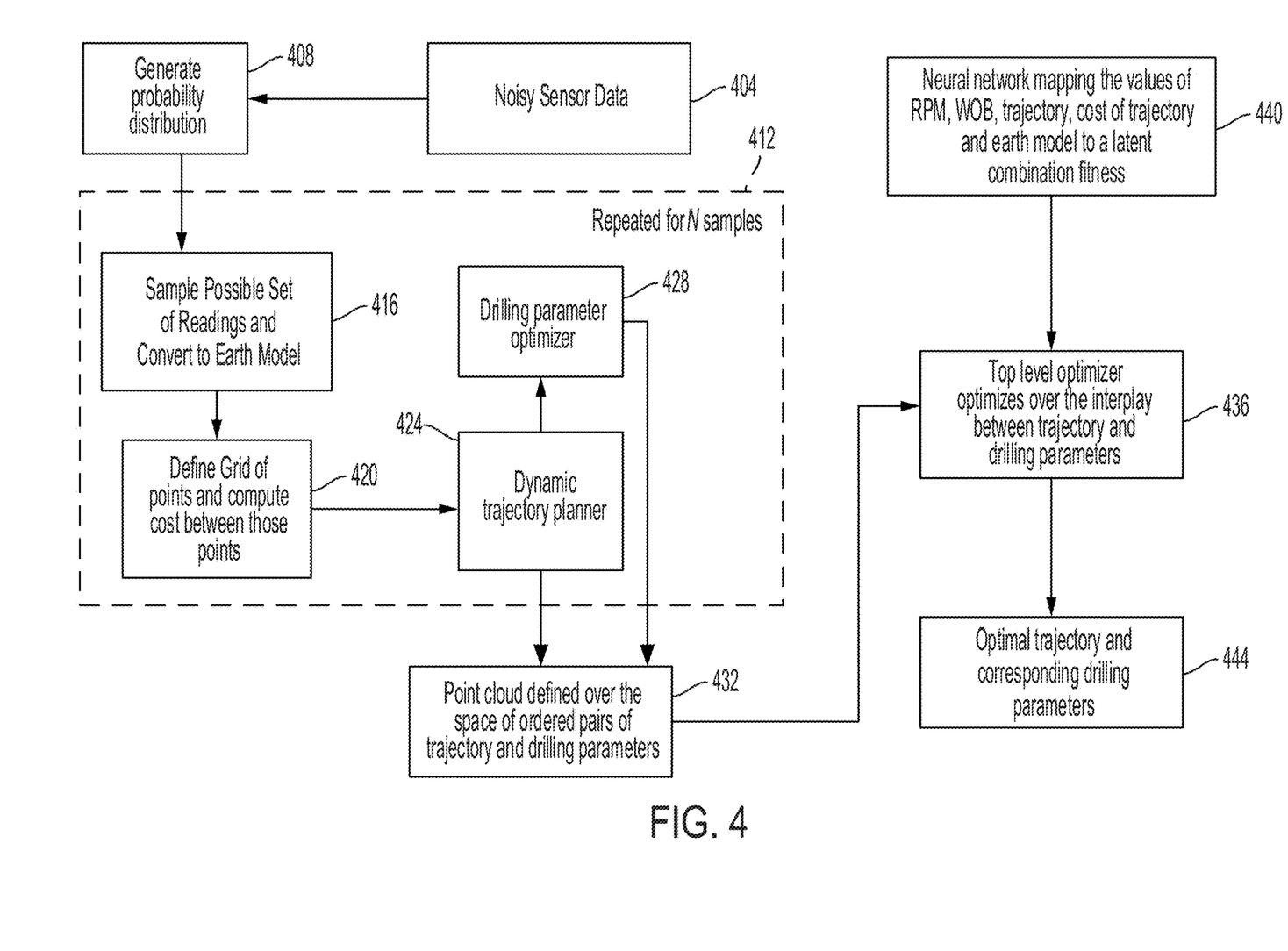
FIG. 4 is a block diagram of an automated concurrent pathfinding and drill parameter optimization process according to at least one aspect of the present disclosure.

FIG. 4 is a block diagram of an automated concurrent pathfinding and drill parameter optimization process according to one aspect of the present disclosure. The process may be initiated at block 404 upon receiving sensor data from one or more sensors of an automated drilling device. The initiation of the process may also include as input a set of coordinates that include one or more of: a start location, and destination location, one or more waypoints between the start location and the destination location. The destination location may be, for example, a reservoir of hydrocarbons. In some instances, the sensor data may be noisy due to the operation of the automated drilling device within the subterranean environment. For example, the vibrations caused by the rotating drill bit can cause so random variations in the measurements collected from some sensors. In some instances, the sensor data may be processed to filter the noise from the sensor data. Examples of processing techniques to reduce noise in the sensor data include, but are not limited to, band pass filters, normalizing sensor data based on sensor type, outlier elimination, applying a machine-learning model such as an artificial neural network, clustering, combinations thereof, or the like.

The sensor data is received at block 408 where a probability distribution is generated from the sensor data. The sensor data may be interpreted to indicate one or more probabilities as to the material composition of portions of the subterranean environment that are proximate to the automated drilling device such as subterranean formations. For example, the sensor data may detect a subterranean formation three feet in front of the automated drilling device. The sensor data may indicate that the subterranean formation has 62% probability of being a rock formation, a 29% probability of being water, and 9% probability of being a false subterranean formation. The sensor data may be interpreted to provide multiple probabilities for each of a multiple portions of the subterranean environment. The probability distribution captures one or more probabilities of the material composition of each portion of the subterranean environment.

The probability distribution can be sampled and each sample separately processed at 412. Any number of samples can be generated from the probability distribution. Sampling may be based on time or permutations of probabilities. For example, each sample may select a particular probability for each portion of the subterranean environment detected by the sensor data. For example, the sensor data may indicate that one foot in front of the automated drilling device has 62% probability of being a rock formation, a 29% probability of being water, and 9% probability of being dirt and one foot below the automated drilling device has a 74% probability of being dirt and a 26% probability of being metal deposits. A first sample can indicate that one foot in front of the automated drilling device is a rock formation and one foot below the automated drilling device is dirt. A second sample can indicate that one foot in from the automated drilling device is water and one foot below the automated drilling device is metal deposits. In some instances, the number of samples generated may be equal to the number of unique combinations of probabilities of material compositions that can be interpreted by the sensor data as indicated by the probability distribution. In other instances, only probabilities that exceed a predetermined threshold may be considered for a sample. For example, the 9% probability that a portion of the subterranean environment from the automated drilling device corresponds to dirt may appear in a sample as the probably fails to exceed a threshold set at 15%. The predetermined threshold may be determined by an operator or by the machine-learning models. The predetermined threshold may be statically set before drilling operations or dynamically selected or refined during drilling operations.

At block 416 an earth model can be generated for a sample. An earth model is a representation of the subterranean environment proximate to the automated drilling device. In some instances, the earth model may include the subterranean environment between the automated drilling device and the destination location. For example, the earth model may be augmented based external data that includes details of the subterranean environment that may not be discernable from the sensor data alone. The earth model can include a representation of each identified material composition of the subterranean environment and any subterranean formations. The earth map can be a three-dimensional representation that is graphical, textual, or any other representation of the subterranean environment. In some instances, an earth model may be generated before the samples obtained from the probability distribution. In those instances, the earth model may be used for each sample and re-generated or updated upon detection of new features within the subterranean environment.

At block 420 the earth model for each sample is converted to a subsurface map on a three-dimensional grid. The grid defines a coordinate system for subsurface map based on the vertices formed by bisecting lines of the grid. The grid can orient the automated drilling device relative to the destination location. A cost function may be calculated between each set of adjacent vertices of the grid. Distances further from than adjacent vertices can be calculated by summing the adjacent vertices between a starting vertex and an ending vertex. The cost can be based on a Euclidean distance or based on a drill cost such as, but not limited to, wear on the automated drilling device such as the drill bit, power cost, fuel cost, time, mechanical specific energy, combinations thereof, or the like. In some instances, the cost may be based on both the Euclidean distance and the drill cost.

At block 424 a dynamic trajectory planner may execute to define a drill path trajectory for the sample. The dynamic trajectory planner may use a BO-HD* process that uses, as input, the subsurface map, the costs between adjacent vertices, and the start location, destination location, and one or more waypoints between the start location and destination location. The Bayesian optimizer may define a path model using a set of path parameters corresponding to the sample. The path parameters include a number of hierarchies, such as costs between adjacent vertices, weights applied to vertices, or the like; refinement distance; resolution of each planning hierarchies. The hierarchies may be based on how coarsely or finely the grid is defined. For instance, the grid may be defined such that the distance between adjacent vertices may be selected as finely x feet such as 1 foot, and as coarsely as k feet such as 100 feet. Since defining drill path trajectories in 1 foot intervals may be computationally intensive, the drill path trajectory can be defined at the coarsest resolution such as k. Then for a certain predetermined "radius" around the current location of the drill bit, the path to the next lower level of hierarchy may be refined. The lower level of the hierarchy may be level of resolution that is lower than the previous resolution, which in this case is less that k but greater than x. This process can be continued until a part of the path in the vicinity of the current drill bit location is defined at the finest level, x.

A wrapper function can be called to define a trajectory using the set of path parameters, the start location, destination location, and the one or more waypoints as input. A set of n locations may be defined that includes the start location, destination location, and the one or more waypoints as ordered sequentially from starting location to destination location. For each location, i, of the set of locations, n, the wrapper function calls an HD* sub-process to define a drill path trajectory with a start location i and end location i+1. The drill path trajectory of HD* may be the shortest, or lowest cost, path from i to i+1. The HD* sub-process returns the drill path trajectory and the cost of that trajectory.

The wrapper function can receive the first drill path trajectory for i to i+1 and the corresponding cost. The wrapper function then calls HD* for a second drill path trajectory based on the next set of adjacent locations in the set of locations such as i+1 and i+2. The wrapper function appends the second drill path trajectory to the first drill path trajectory and adds the corresponding cost of the second drill path trajectory to the cost of the first drill path trajectory. The wrapper function can continue to call the HD* sub-process until there are no more locations left in the set of locations at which point the a drill path trajectory extends from the start location, through each waypoint of the one or more waypoints, and terminates at the destination location and a cost can be associated with the complete drill path trajectory. The cost of the complete drill path trajectory can be appended to the set of path parameters and the Bayesian optimizer can be updated using the appended set of path parameters.

At block 428, drilling parameter optimizer may execute to define drill parameters for the complete drill path trajectory for the sample. The drill parameters include the revolutions-per-minute (RPM), weight-on-bit (WOB), mud flow rate (Q), rate-of-penetration (ROP), hydromechanical specific energy (HMSE). Rate of penetration can defined by ROP=K(WOB)$^{\alpha 1}$(RPM)$^{\alpha 2}$, where K is a drilling constant, α1 and α2 are data derived constants. Hydromechanical specific energy can be defined by $$HMSE = \frac{(WOB) - \eta F}{A_b} + \frac{120(RPM)T + \eta(P)Q}{A_b(ROP)},$$

where η is a coefficient of friction, F is the impact force, T is the torque applied to the drill bit, P is the pressure drop across the drill bit, and $A_b$ is the bit area.

Drilling parameter optimizer generates multi-objective Bayesian optimizer model to sample the drill parameters. The model use random or grid sampling of various weight-on-bit, mud flow rate, and revolutions-per-minute values. The model may identity for each set of weight-on-bit, mud flow rate, and revolutions-per-minute values what the corresponding rate-of-penetration and hydromechanical specific energy would be. The costs associated with each rate-of-penetration and hydromechanical specific energy values of each sample may be evaluated. The costs can be appended to the drill parameters to update the Bayesian optimizer model. Drilling parameter optimizer may select the sample with the lowest cost set of drill parameters. The selected drill parameters may be output along with the complete drill path trajectory to block 432 in an array that stores the pair of data points. Any other data storage data structure may be used.

Block 432 receives each complete drill path trajectory from block 424 and the drill parameters for the complete drill path trajectory from block 428 for each sample of the set of samples of 412. If there are more samples to process, then the process can return to block 416 where another sample can be processed. Block 432 aggregates the drill path trajectories and drill parameters for each sample and generates a point cloud out of each pair of drill path trajectory and drill parameters. The point cloud provides a representation of each pair of drill path trajectory and drill parameters enable direct comparison with other pairs of each pair of drill path trajectories and drill parameters.

At block 436 a top level Bayesian optimizer samples the point cloud generating a set of samples, each sample including a drill path trajectory and corresponding drill parameters. Each sample of the set of samples may evaluated to determine how well that sample fits the current circumstances of the automated drilling device at block 440. For example, a neural network such as a long short-term memory may be used to establish the fitness of each sample. The output layer of the neural network can be used as an embedded representation that can provide a fixed dimensionality representation of a variable length drill path trajectory. The embedded representation may be fused with the corresponding drill parameters and passed through a feedforward network. The feedforward network generates an output between zero, a bad sample, to one, a best sample. The sample with a value closest or equal to one can be selected and output in block 444.

The output of block 444 may cause the automated drilling device to initiate drilling operations along the selected drill path trajectory using the corresponding drilling parameters. In some instances, drilling operations may continue until the automated drilling device detects that it has reached the destination location. In other instances, the automated drilling device may drill for a predetermined interval and then return to block 404 in which the new sensor data may be received. The process 400 may repeat for every interval until the automated drilling device receives a command to cease operations or until the automated drilling device reaches the destination location. The interval may be based on time or drilling distance. For example, the drill path trajectory and corresponding drill parameters of 404-444 may be determined upon the expiration of a time interval such as 30 seconds, 1 minutes, 10 minutes, or the like. As another example, the drill path trajectory and corresponding drill parameters of 404-444 may be determined every few feet such as 1 foot, 3 feet, 10 feet, or the like. Any time interval, distance interval, or combination thereof may be selected as an interval in which the process of 404-444 may be executed.

Figure 5:
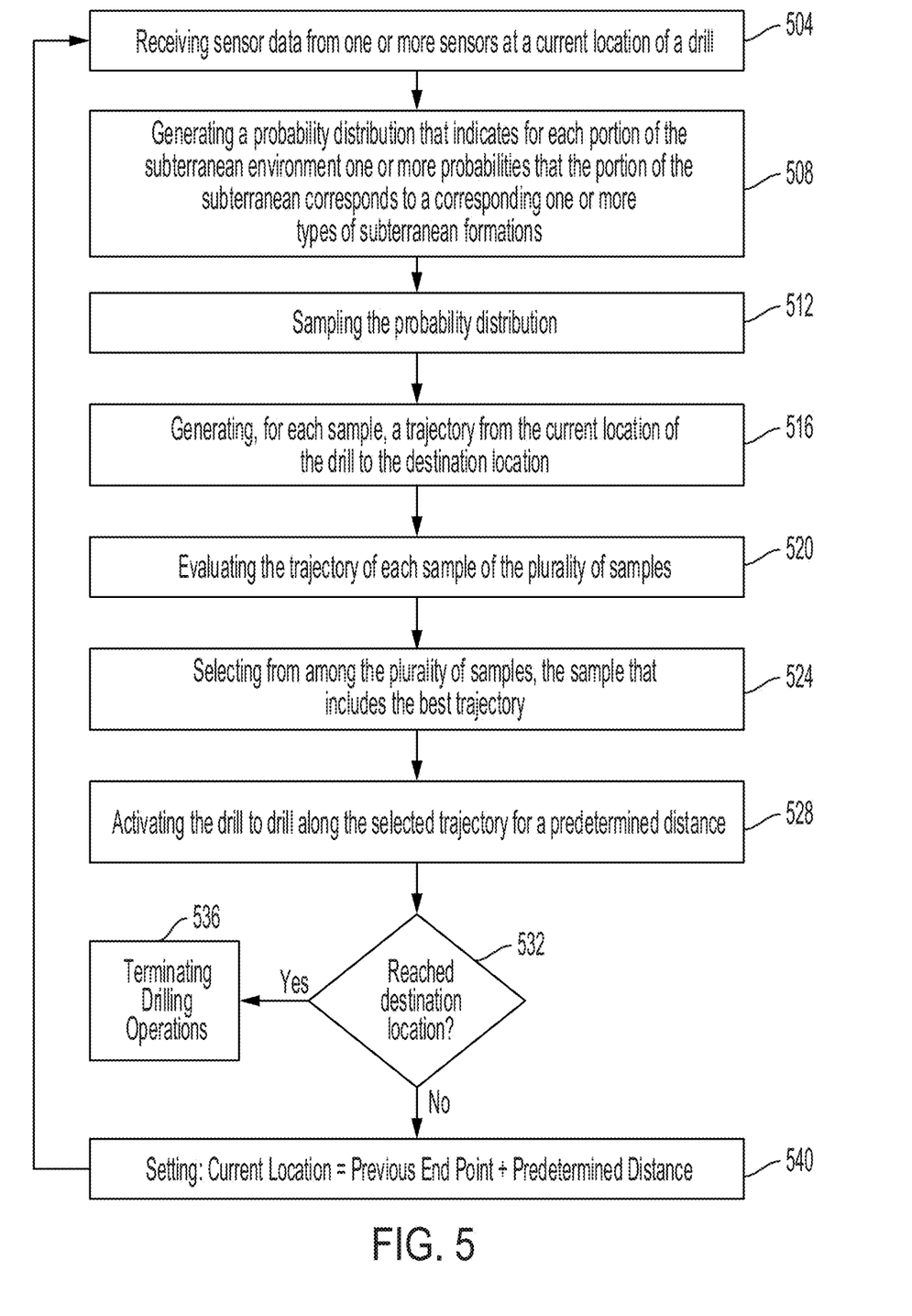
FIG. 5 is a flowchart of a process for automated concurrent pathfinding for an automated drilling device according to at least one aspect of the present disclosure.

FIG. 5 is a flowchart of a process 500 for automated concurrent pathfinding for an automated drilling device according to one aspect of the present disclosure. At block 504, sensor data may be received from one or more sensors of an automated drilling device. The sensor data may be received while the automated drilling device is positioned at a current location within a subterranean environment. The current location may be at a starting location of the automated drilling device. The current location may be a previous end point, such as a location of the automated drilling device after one or more iterations of the process of FIG. 5 when the automated drilling device has already drilled a portion of the distance between the starting location and destination location. The destination location may be reservoir such as subterranean formation including hydrocarbons or the like.

At block 508, a probability distribution may be generated. The probability distribution indicates, for each portion of the subterranean environment of multiple portions of the subterranean environment, one or more probabilities that the portion of the subterranean corresponds to a corresponding one or more types of subterranean formations. The subterranean environment may be represented by multiple portions each of which including a material composition. Examples of material compositions of a subterranean environment can include dirt, one or more types of rock, metal deposits or ore, water, mineral deposits, hydrocarbons, combinations thereof, and the like.

The sensor data may include noise due to the vibration of the drill bit of the automated drilling device or from other sources. The sensor data may not indicate with 100% certainty that the any portion of the subterranean environment corresponds to a particular material composition. Instead, the sensor data may be interpreted to indicate that each discrete portion of the subterranean environment corresponds to one or more probabilities of one or more material composition such as 62% likelihood of being dirt, 24% likelihood of being rock, 9% likelihood of being mineral deposits, and 5% likelihood of being water. In some instances, a single probability distribution may be generated to capture the probabilities of each discrete portion of the subterranean environment or each discrete portion of the subterranean environment detectable by the sensor data. In other instances, multiple probability distributions may be generated, one for each discrete portion of the subterranean environment.

At block 512, the probability distribution(s) can be sampled. Each sample may select a material composition from the multiple probabilities associated with each discrete portion of the subterranean environment. In some instances, only the probabilities over a threshold value may be selectable. In other instances, all probabilities may be selectable. At block 516, a drill path trajectory can be generated for each sample based on the current location of the automated drilling device and the destination location. A BO-HD* process may be used to generate each trajectory. Drill parameters such as revolutions-per-minute, weight-on-bit, mud flow rate, rate-of-penetration, and hydromechanical specific energy may be determined for each drill path trajectory for each sample.

At block 520, each the drill path trajectory and drill parameters of each sample are evaluated against corresponding drill path trajectories and dill parameters of other samples. In some instances, a neural network may be used to provide a value indicative of a fitness of a particular drill path trajectory and drill parameters pair. The neural network may be trained using supervised learning using experts in subterranean drilling or unsupervised learning using historical drill data. The neural network may be, for example, a long short-term memory. The value indicative of a fitness may be a real number between zero, indicating unfit, and one, indicate a best fit. Other evaluation processes may be used in place of the numerical value between zero and one. For example, an integer value, a percentage of 100%, a Boolean value indicate True or False, or the like may be used to indicate which samples have a viable pair of drill path trajectories and drill parameters and which samples do not.

The evaluation may be based on cost such that a low cost sample may be given a higher value than a high cost sample. Cost may be based on Euclidean distance, drilling cost, combinations thereof, or the like. Drilling cost may include, but not limited to, one or more of: time, fuel, power, wear on the automated drilling device or drill bit, rate-of-penetration, hydromechanical specific energy, combinations thereof and the like. At block 524, the sample, with the highest fitness, thereby the lowest, may be selected.

At block 528, the automated drilling device 204 may initiate drilling operations by activating an actuator that controls the rotation of the drill bit. The automated drilling device may activate the drill, based on the drill parameters, at the particular revolutions-per-minute, mud flow rate, and using the particular weight-on-bit of the selected sample. In some instances, the drilling operations may be active until the automated drilling device reaches the destination location. In other instances, the drilling operations continue until a particular interval has lapsed. The interval may be based on time or a predetermined distance. For example, the automated drilling device may drill along the drill path trajectory of the selected sample for x feet before re-evaluating the drill path trajectory or ceasing operations.

At block 532, it is determined whether the automated drilling device has reached the destination location. If the automated drilling device has reached the destination location then control pass to block 536 where drilling operations terminate and the drilling device goes offline. Alternatively, the drilling device may return to the surface site using the drilled path. On the other hand, if it is determined that the automated drilling device has not reached the destination location, at block 540, the current location of the automated drilling device can be updated such that the current location is equal to the previous end point plus the predetermined distance drilled. Once the current location of the automated drilling device is updated, the control passes to block 504 where new sensor data may be received.

Blocks 504-540 may be repeated any number of times. For example, each execution of blocks 504-540 can cause the automated drilling device to travel a predetermined distance along the drill path trajectory before the drill path trajectory is updated with new sensor data. Blocks 504-540 may represent an iterative process that executes a predetermined number of times as the automated drilling device drills towards the destination location. In some instances, blocks 504-540 may be each executed in-order, out-of-order, once, or more than once before the process terminates. The process may not terminate until the automated drilling device reaches the destination location at block 540.

In some aspects, systems and methods for automated concurrent path planning and drilling parameter optimization using robotics are provided according to the following examples. As used below, any reference to a series of examples is to be understood as a reference to each of those examples disjunctively (e.g., "Examples 1-4" is to be understood as "Examples 1, 2, 3, or 4").

Example 1 is a system comprising: a drill bit to create a path from a starting location to a destination location within a subterranean environment; one or more sensors that measure characteristics of a portion of the subterranean environment that is proximate to the drill bit and characteristics of the drill bit; one or more processors; one or more memories connected to the one or more processors for storing instructions that are executable by the one or more processors to cause the one or more processors to perform operations including: receiving sensor data from the one or more sensors; generating, using the sensor data, a probability distribution that indicates, for each portion of the subterranean environment between a current location of the drill bit and the destination location, one or more probabilities, each probability of the one or more probabilities indicating a likelihood that the portion of the subterranean environment corresponds to a type of subterranean formation; generating a plurality of samples from the probability distribution, each sample selecting, for each portion of the subterranean environment between the drill bit and the destination location, a particular probability from the one or more probabilities, the particular probability corresponding to a particular type of subterranean formation; generating, for each sample of the plurality of samples, a trajectory from the current location of the drill bit to the destination location; evaluating, for each sample of the plurality of samples, a cost of the trajectory; selecting, using a neural network, a particular sample of the plurality of samples that includes a trajectory with a lowest cost; and activating the drill bit to drill along the trajectory of the particular sample, wherein the drill is activated for a predetermined distance.

Example 2 is the system of example(s) 1, wherein generating the trajectory includes defining a cost of transitioning from the current location of the drill to the destination location, the cost being based at least in part on a Euclidean distance between the current location of the drill to the destination location or one or more drilling parameters associated with drilling from the current location of the drill to the destination location.

Example 3 is the system of any of example(s) 1-2, wherein the neural network is trained using supervised learning.

Example 4 is the system of any of example(s) 1-3, wherein the operations further include: defining, for each sample of the plurality of samples, drilling parameters for the trajectory, the drilling parameters include a weight-on-bit value, mud flow rate value, and a revolutions-per-minute value.

Example 5 is the system of any of example(s) 1-4, wherein the trajectory for each sample of the plurality of samples is generated by: generating a map of the subterranean environment using the sample; defining a coordinate grid over the map; determining costs between adjacent locations of the coordinate grid; and generating the trajectory between the current location of the drill and the destination location based on aggregating of a cost of each adjacent location of the coordinate grid that is between the current location of the drill and the destination location.

Example 6 is the system of any of example(s) 1-5, wherein the operations further include: receiving new sensor data after the drill traverses the predetermined distance; generating a new probability distribution using the new sensor data; generating a plurality of new samples using the new probability distribution; generating a new trajectory for each new sample of the plurality of new samples; determining, using the neural network, a particular new sample of the plurality of new samples that includes a best new trajectory; and activating the drill to drill along the new trajectory for the predetermined distance.

Example 7 is the system of any of example(s) 1-7, wherein the operations further include: executing a fitness function on the neural network, the fitness function including one or more inputs and one or more outputs; determining that the one or more outputs does not exceed a threshold; and retraining the neural network.

Example 8 is a method comprising: receiving sensor data from one or more sensors; generating, using the sensor data, a probability distribution that indicates, for each portion of a subterranean environment between a current location of a drill bit and a destination location, one or more probabilities, each probability of the one or more probabilities indicating a likelihood that the portion of the subterranean environment corresponds to a type of subterranean formation; generating a plurality of samples from the probability distribution, each sample selecting, for each portion of the subterranean environment between the drill bit and the destination location, a particular probability from the one or more probabilities, the particular probability corresponding to a particular type of subterranean formation; generating, for each sample of the plurality of samples, a trajectory from the current location of the drill bit to the destination location; evaluating, for each sample of the plurality of samples, a cost of the trajectory; selecting, using a neural network, a particular sample of the plurality of samples that includes a trajectory with a lowest cost; and activating the drill bit to drill along the trajectory of the particular sample, wherein the drill bit is activated for a predetermined distance.

Example 9 is the method of example(s) 8, wherein generating the trajectory includes defining a cost of transitioning from the current location of the drill bit to the destination location, the cost being based at least in part on a Euclidean distance between the current location of the drill bit to the destination location or one or more drilling parameters associated with drilling from the current location of the drill bit to the destination location.

Example 10 is the method of any of example(s) 8-9, wherein the neural network is trained using supervised learning.

Example 11 is the method of any of example(s) 8-10, further comprising: defining, for each sample of the plurality of samples, drilling parameters for the trajectory, the drilling parameters include a weight-on-bit value, mud flow rate value, and a revolutions-per-minute value.

Example 12 is the method of any of example(s) 8-11, wherein the trajectory for each sample of the plurality of samples is generated by: generating a map of the subterranean environment using the sample; defining a coordinate grid over the map; determining costs between adjacent locations of the coordinate grid; and generating the trajectory between the current location of the drill bit and the destination location based on aggregating of a cost of each adjacent location of the coordinate grid that is between the current location of the drill bit and the destination location.

Example 13 is the method of any of example(s) 8-12, further comprising: receiving new sensor data after the drill bit traverses the predetermined distance; generating a new probability distribution using the new sensor data; generating a plurality of new samples using the new probability distribution; generating a new trajectory for each new sample of the plurality of new samples; determining, using the neural network, a particular new sample of the plurality of new samples that includes a best new trajectory; and activating the drill bit to drill along the new trajectory for the predetermined distance.

Example 14 is the method of any of example(s) 8-13, further comprising: executing a fitness function on the neural network, the fitness function including one or more inputs and one or more outputs; determining that the one or more outputs do not exceed a threshold; and retraining the neural network.

Example 15 is a non-transitory computer-readable medium including instructions that are executable by one or more processors to cause the one or more processors to perform operations including: receiving sensor data from one or more sensors; generating, using the sensor data, a probability distribution that indicates, for each portion of a subterranean environment between a current location of a drill bit and a destination location, one or more probabilities, each probability of the one or more probabilities indicating a likelihood that the portion of the subterranean environment corresponds to a type of subterranean formation; generating a plurality of samples from the probability distribution, each sample selecting, for each portion of the subterranean environment between the drill bit and the destination location, a particular probability from the one or more probabilities, the particular probability corresponding to a particular type of subterranean formation; generating, for each sample of the plurality of samples, a trajectory from the current location of the drill bit to the destination location; evaluating, for each sample of the plurality of samples, a cost of the trajectory; selecting, using a neural network, a particular sample of the plurality of samples that includes a trajectory with a lowest cost; and activating the drill bit to drill along the trajectory of the particular sample, wherein the drill is activated for a predetermined distance.

Example 16 is the non-transitory computer-readable medium of example(s) 15, wherein generating the trajectory includes defining a cost of transitioning from the current location of the drill bit to the destination location, the cost being based at least in part on a Euclidean distance between the current location of the drill bit to the destination location or one or more drilling parameters associated with drilling from the current location of the drill bit to the destination location.

Example 17 is the non-transitory computer-readable medium of any of example(s) 15-16, wherein the neural network is trained using supervised learning.

Example 18 is the non-transitory computer-readable medium of any of example(s) 15-17, wherein the operations further include: defining, for each sample of the plurality of samples, drilling parameters for the trajectory, the drilling parameters include a weight-on-bit value, mud flow rate value, and a revolutions-per-minute value.

Example 19 is the non-transitory computer-readable medium of any of example(s) 15-18, wherein the trajectory for each sample of the plurality of samples is generated by: generating a map of the subterranean environment using the sample; defining a coordinate grid over the map; determining costs between adjacent locations of the coordinate grid; and generating the trajectory between the current location of the drill bit and the destination location based on aggregating of a cost of each adjacent location of the coordinate grid that is between the current location of the drill bit and the destination location.

Example 20 is the non-transitory computer-readable medium of any of example(s) 15-19, wherein the operations further include: receiving new sensor data after the drill bit traverses the predetermined distance; generating a new probability distribution using the new sensor data; generating a plurality of new samples using the new probability distribution; generating a new trajectory for each new sample of the plurality of new samples; determining, using the neural network, a particular new sample of the plurality of new samples that includes a best new trajectory; and activating the drill bit to drill along the new trajectory for the predetermined distance.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, or any combination thereof. When implemented in software, firmware, middleware, scripting language, microcode, or combinations thereof, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, program statements, or combinations thereof. A code segment may be coupled to another code segment or a hardware circuit by passing or receiving information, data, arguments, parameters, memory contents, or combinations thereof. Information, arguments, parameters, data, etc. may be passed, forwarded, or transmitted via any suitable means including memory sharing, message passing, token passing, network transmission, etc.

For a implementations in firmware, software, or combinations thereof, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices, other machine readable mediums for storing information, or combinations thereof. The term "non-transitory computer-readable medium" includes, but is not limited to portable or fixed storage devices, optical storage devices, or various other storage mediums capable of storing that can persistently contain or carry instruction(s), data, or combinations thereof.

While the principles of the disclosure have been described above in connection with specific apparatuses and methods, it is to be clearly understood that this description is made only by way of example and not as limitation on the scope of the disclosure.

What is claimed is:

1. A system comprising:
   a drill bit to create a path from a starting location to a destination location within a subterranean environment;
   one or more sensors that measure characteristics of a portion of the subterranean environment that is proximate to the drill bit and characteristics of the drill bit;
   one or more processors;
   one or more memories connected to the one or more processors for storing instructions that are executable by the one or more processors to cause the one or more processors to perform operations including:
      receiving sensor data from the one or more sensors;
      generating, using the sensor data, a probability distribution that indicates, for each portion of the subterranean environment between a current location of the drill bit and the destination location, one or more probabilities, each probability of the one or more probabilities indicating a likelihood that the portion of the subterranean environment corresponds to a type of subterranean formation;
      generating a plurality of samples from the probability distribution, each sample selecting, for each portion of the subterranean environment between the drill bit and the destination location, a particular probability from the one or more probabilities, the particular probability corresponding to a particular type of subterranean formation;
      generating, for each sample of the plurality of samples, a trajectory from the current location of the drill bit to the destination location;
      evaluating, for each sample of the plurality of samples, a cost of the trajectory;
      selecting, using a neural network, a particular sample of the plurality of samples that includes a trajectory with a lowest cost; and
      activating the drill bit to drill along the trajectory of the particular sample, wherein the drill is activated for a predetermined distance.

2. The system of claim 1, wherein generating the trajectory includes defining a cost of transitioning from the current location of the drill to the destination location, the cost being based at least in part on a Euclidean distance between the current location of the drill to the destination location or one or more drilling parameters associated with drilling from the current location of the drill to the destination location.

3. The system of claim 1, wherein the neural network is trained using supervised learning.

4. The system of claim 1, wherein the operations further include:
   defining, for each sample of the plurality of samples, drilling parameters for the trajectory, the drilling parameters include a weight-on-bit value, mud flow rate value, and a revolutions-per-minute value.

5. The system of claim 1, wherein the trajectory for each sample of the plurality of samples is generated by:
   generating a map of the subterranean environment using the sample;
   defining a coordinate grid over the map;
   determining costs between adjacent locations of the coordinate grid; and
   generating the trajectory between the current location of the drill and the destination location based on aggregating of a cost of each adjacent location of the coordinate grid that is between the current location of the drill and the destination location.

6. The system of claim 1, wherein the operations further include:
   receiving new sensor data after the drill traverses the predetermined distance;
   generating a new probability distribution using the new sensor data;
   generating a plurality of new samples using the new probability distribution;
   generating a new trajectory for each new sample of the plurality of new samples;
   determining, using the neural network, a particular new sample of the plurality of new samples that includes a best new trajectory; and
   activating the drill to drill along the new trajectory for the predetermined distance.

7. The system of claim 1, wherein the operations further include:
   executing a fitness function on the neural network, the fitness function including one or more inputs and one or more outputs;
   determining that the one or more outputs does not exceed a threshold; and
   retraining the neural network.

8. A method comprising:
   receiving sensor data from one or more sensors;
   generating, using the sensor data, a probability distribution that indicates, for each portion of a subterranean environment between a current location of a drill bit and a destination location, one or more probabilities, each probability of the one or more probabilities indicating a likelihood that the portion of the subterranean environment corresponds to a type of subterranean formation;

generating a plurality of samples from the probability distribution, each sample selecting, for each portion of the subterranean environment between the drill bit and the destination location, a particular probability from the one or more probabilities, the particular probability corresponding to a particular type of subterranean formation;

generating, for each sample of the plurality of samples, a trajectory from the current location of the drill bit to the destination location;

evaluating, for each sample of the plurality of samples, a cost of the trajectory;

selecting, using a neural network, a particular sample of the plurality of samples that includes a trajectory with a lowest cost; and activating the drill bit to drill along the trajectory of the particular sample, wherein the drill bit is activated for a predetermined distance.

9. The method of claim 8, wherein generating the trajectory includes defining a cost of transitioning from the current location of the drill bit to the destination location, the cost being based at least in part on a Euclidean distance between the current location of the drill bit to the destination location or one or more drilling parameters associated with drilling from the current location of the drill bit to the destination location.

10. The method of claim 8, wherein the neural network is trained using supervised learning.

11. The method of claim 8, further comprising:
defining, for each sample of the plurality of samples, drilling parameters for the trajectory, the drilling parameters include a weight-on-bit value, mud flow rate value, and a revolutions-per-minute value.

12. The method of claim 8, wherein the trajectory for each sample of the plurality of samples is generated by:
generating a map of the subterranean environment using the sample;
defining a coordinate grid over the map;
determining costs between adjacent locations of the coordinate grid; and
generating the trajectory between the current location of the drill bit and the destination location based on aggregating of a cost of each adjacent location of the coordinate grid that is between the current location of the drill bit and the destination location.

13. The method of claim 8, further comprising:
receiving new sensor data after the drill bit traverses the predetermined distance;
generating a new probability distribution using the new sensor data;
generating a plurality of new samples using the new probability distribution;
generating a new trajectory for each new sample of the plurality of new samples;
determining, using the neural network, a particular new sample of the plurality of new samples that includes a best new trajectory; and
activating the drill bit to drill along the new trajectory for the predetermined distance.

14. The method of claim 8, further comprising:
executing a fitness function on the neural network, the fitness function including one or more inputs and one or more outputs;
determining that the one or more outputs do not exceed a threshold; and
retraining the neural network.

15. A non-transitory computer-readable medium including instructions that are executable by one or more processors to cause the one or more processors to perform operations including:
receiving sensor data from one or more sensors;
generating, using the sensor data, a probability distribution that indicates, for each portion of a subterranean environment between a current location of a drill bit and a destination location, one or more probabilities, each probability of the one or more probabilities indicating a likelihood that the portion of the subterranean environment corresponds to a type of subterranean formation;
generating a plurality of samples from the probability distribution, each sample selecting, for each portion of the subterranean environment between the drill bit and the destination location, a particular probability from the one or more probabilities, the particular probability corresponding to a particular type of subterranean formation;
generating, for each sample of the plurality of samples, a trajectory from the current location of the drill bit to the destination location;
evaluating, for each sample of the plurality of samples, a cost of the trajectory;
selecting, using a neural network, a particular sample of the plurality of samples that includes a trajectory with a lowest cost; and
activating the drill bit to drill along the trajectory of the particular sample, wherein the drill is activated for a predetermined distance.

16. The non-transitory computer-readable medium of claim 15, wherein generating the trajectory includes defining a cost of transitioning from the current location of the drill bit to the destination location, the cost being based at least in part on a Euclidean distance between the current location of the drill bit to the destination location or one or more drilling parameters associated with drilling from the current location of the drill bit to the destination location.

17. The non-transitory computer-readable medium of claim 15, wherein the neural network is trained using supervised learning.

18. The non-transitory computer-readable medium of claim 15, wherein the operations further include:
defining, for each sample of the plurality of samples, drilling parameters for the trajectory, the drilling parameters include a weight-on-bit value, mud flow rate value, and a revolutions-per-minute value.

19. The non-transitory computer-readable medium of claim 15, wherein the trajectory for each sample of the plurality of samples is generated by:
generating a map of the subterranean environment using the sample;
defining a coordinate grid over the map;
determining costs between adjacent locations of the coordinate grid; and
generating the trajectory between the current location of the drill bit and the destination location based on aggregating of a cost of each adjacent location of the coordinate grid that is between the current location of the drill bit and the destination location.

20. The non-transitory computer-readable medium of claim 15, wherein the operations further include:
receiving new sensor data after the drill bit traverses the predetermined distance;
generating a new probability distribution using the new sensor data;

generating a plurality of new samples using the new probability distribution;

generating a new trajectory for each new sample of the plurality of new samples;

determining, using the neural network, a particular new sample of the plurality of new samples that includes a best new trajectory; and activating the drill bit to drill along the new trajectory for the predetermined distance.

* * * * *